United States Patent
Sakamoto et al.

(10) Patent No.: US 8,087,231 B2
(45) Date of Patent: Jan. 3, 2012

(54) DETERIORATION-DETERMINATION APPARATUS FOR EXHAUST GAS PURIFYING SYSTEM

(75) Inventors: Yuri Sakamoto, Obu (JP); Masahiko Kimura, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 956 days.

(21) Appl. No.: 12/068,493

(22) Filed: Feb. 7, 2008

(65) Prior Publication Data

US 2008/0196390 A1    Aug. 21, 2008

(30) Foreign Application Priority Data

Feb. 19, 2007  (JP) .................................. 2007-37300

(51) Int. Cl.
*F01N 3/00* (2006.01)
(52) U.S. Cl. ................ 60/277; 60/274; 60/276; 60/285; 60/295
(58) Field of Classification Search .................... 60/275, 60/284–287, 276, 277
See application file for complete search history.

(56) References Cited

U.S. PATENT DOCUMENTS

| | | | |
|---|---|---|---|
| 5,088,281 A | | 2/1992 | Izutani et al. |
| 5,279,116 A | * | 1/1994 | Shimizu et al. ................. 60/277 |
| 5,386,695 A | * | 2/1995 | Iwata et al. ..................... 60/276 |
| 5,636,514 A | * | 6/1997 | Seki ................................ 60/277 |
| 5,644,912 A | * | 7/1997 | Kawamura ...................... 60/276 |
| 5,737,916 A | * | 4/1998 | Mitsutani ........................ 60/276 |
| 5,806,306 A | | 9/1998 | Okamoto et al. |
| 6,470,674 B1 | | 10/2002 | Yamaguchi et al. |
| 6,591,183 B2 | | 7/2003 | Ishikawa et al. |
| 6,981,369 B2 | * | 1/2006 | Miura ............................. 60/285 |
| 2006/0137326 A1 | * | 6/2006 | Saito et al. ..................... 60/277 |

FOREIGN PATENT DOCUMENTS

| | | |
|---|---|---|
| JP | 2002-122033 | 4/2002 |
| JP | 2005-133626 | 5/2005 |
| JP | 2006-291773 | 10/2006 |

OTHER PUBLICATIONS

Japanese Office Action dated Nov. 15, 2010, issued in corresponding Japanese Application No. 2007-037300 with English Translation.

* cited by examiner

*Primary Examiner* — Thomas Denion
*Assistant Examiner* — Jesse Bogue
(74) *Attorney, Agent, or Firm* — Nixon & Vanderhye PC (57) ABSTRACT

A main feedback control based on an output of an upstream sensor, and a sub-feedback control based on an output of a downstream sensor are executed. A specified fuel disturbance is inputted and an output of the downstream sensor is measured to derive a characteristic value. Based on the characteristic value, it is determined whether a purifying capacity of the exhaust gas purifying system including the catalyst, the upstream sensor, and the downstream sensor is deteriorated.

10 Claims, 12 Drawing Sheets

DETERIORATION-DETERMINATION APPARATUS FOR EXHAUST GAS PURIFYING SYSTEM

CROSS-REFERENCE TO RELATED APPLICATION

This application is based on Japanese Patent Application No. 2007-37300 filed on Feb. 19, 2007, the disclosure of which is incorporated herein by reference.

FIELD OF THE INVENTION

The present invention relates to a deterioration-determination apparatus for an exhaust gas purifying system which includes a catalyst and sensors disposed upstream and downstream of the catalyst for exhaust gas purification. The sensors respectively detect air-fuel ratio or rich/lean of exhaust gas.

BACKGROUND OF THE INVENTION

JP-2001-304018A (U.S. Pat. No. 6,591,183B2) shows an exhaust purifying system which includes sensors disposed upstream and downstream of a catalyst. The sensors respectively detect air-fuel ratio or rich/lean of exhaust gas. In such a system, a main feedback control is executed based on an output of the upstream sensor and a sub-feedback control is executed based on an output of the downstream sensor. In the main feedback control, a fuel injection quantity is feedback corrected so that air-fuel ratio upstream of the catalyst becomes a target air-fuel ratio. In the sub-feedback control, the fuel injection quantity or the target air fuel ratio is corrected, or a feedback quantity of the main feedback control is adjusted.

In order to restrict an increment of emission due to a deterioration of the catalyst, JP-2006-291773A discloses a system in which fuel injection quantity is alternately varied into rich or lean so that air fuel ratio of exhaust gas flowing into a catalyst is alternately varied to rich or lean. Thereby, a deterioration-determination of the catalyst is conducted based on a behavior of the output of the downstream sensor.

In this system, when a deterioration-determination of the catalyst is conducted during the sub-feedback control, the deterioration-determination becomes a closed-loop so that it is relatively difficult to compute a deterioration-determination parameter (for example, loss time, correlation coefficient, or oxygen occluded quantity). JP-2001-132434A (U.S. Pat. No. 6,470,674B1) shows a system in which a sub-feedback control is stopped in a deterioration-determination period, or a control constant of the sub-feedback control is varied to execute a deterioration-determination.

In the above system, the emissions are deteriorated in the deterioration-determination period. Even if a deterioration of the catalyst itself is accurately obtained, a deterioration of a purifying capacity of the entire exhaust gas purifying system including the catalyst and sensors cannot be determined.

SUMMARY OF THE INVENTION

The present invention is made in view of the above matters, and it is an object of the present invention to provide a deterioration-determination apparatus for an exhaust gas purifying system which can determine whether a purifying capacity of the exhaust gas purifying system as a whole is deteriorated without deterioration of emissions.

According to the present exemplary embodiment, a deterioration-determination apparatus for an exhaust gas purifying system includes a catalyst in an exhaust passage of an engine for purifying exhaust gas, and an upstream sensor and a downstream sensor that respectively detect an air-fuel ratio or a rich/lean of the exhaust gas. The upstream sensor is disposed upstream of the catalyst, the downstream sensor is disposed downstream of the catalyst. The apparatus further includes a feedback control means for performing a feedback control in which a fuel injection quantity is feedback corrected based on an output of the upstream sensor so that an air-fuel ratio upstream of the catalyst becomes a target air-fuel ratio, a sub-feedback control means for adjusting the fuel injection quantity or the main feedback control based on an output of the downstream sensor, and a deterioration-determination means for determining whether a purifying capacity of the exhaust gas purifying system including the catalyst, the upstream sensor, and the downstream sensor is deteriorated based on a behavior of an output of the downstream sensor into which a fuel disturbance is inputted during the main feedback control and the sub-feedback control.

According to the above configuration, since it is determined whether a purifying capacity of the exhaust gas purifying system is deteriorated based on the behavior of the output of the downstream sensor into which the fuel disturbance is inputted, it is well determined whether the capacity of the system as a whole is deteriorated without deteriorating emissions.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Referring to drawings, embodiments of the present invention will be described hereinafter.

First Embodiment

Figure 1:
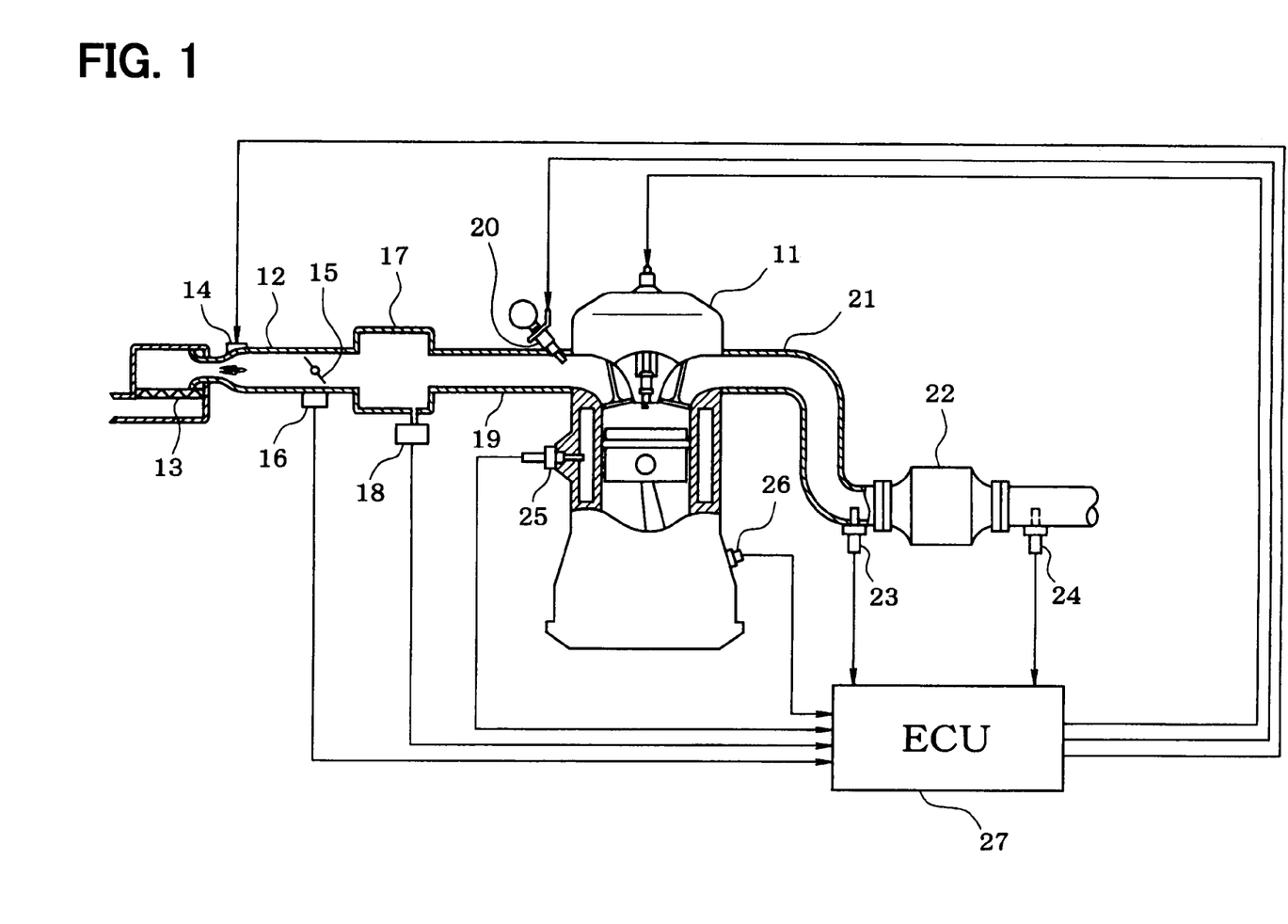
FIG. 1 is a schematic view of an engine control system according to a first embodiment.

Referring to FIG. 1, an engine control system is schematically explained. An air cleaner 13 is arranged upstream of an intake pipe 12 of an internal combustion engine 11. An air-flow meter 14 detecting an intake air flow rate is provided downstream of the air cleaner 13. A throttle valve 15 and a throttle position sensor 16 which detects an opening degree of the throttle valve 15 are provided downstream of the air flow meter 14.

A surge tank 17 including an intake air pressure sensor 18 is provided down steam of the throttle valve 15. The intake air pressure sensor 18 detects intake air pressure. An intake manifold 19 which introduces air into each cylinder of the engine 11 is connected to the surge tank 17. A fuel injector 20 which injects the fuel is provided at a vicinity of an intake port of the intake manifold 19 of each cylinder.

An exhaust pipe 21 of the engine 11 is provided with a three-way catalyst 22 which reduces CO, HC, NOx, and the like. An upstream sensor 23 which detects air-fuel ratio of the exhaust gas is disposed upstream of the catalyst 22, and a downstream sensor 24 which detects rich/lean of the exhaust gas is disposed downstream of the catalyst 22. In the present embodiment, the upstream sensor 23 is an air-fuel ratio sensor (linear A/F sensor) which outputs linear air-fuel-ratio signal according to the air-fuel ratio of the exhaust gas. The downstream sensor 24 is an oxygen sensor of which output voltage reverses according to whether the air-fuel ratio of the exhaust gas is rich or lean relative to a stoichiometric air fuel ratio. A coolant temperature sensor 25 detecting a coolant temperature, and a crank angle sensor 26 outputting a pulse signal every predetermined crank angle of a crankshaft of the engine 11 are disposed on a cylinder block of the engine 11.

The outputs from the above sensors are inputted into an electronic control unit 27, which is referred to an ECU hereinafter. The ECU 27, which includes a microcomputer, performs a main feedback control and a sub-feedback control by executing an air-fuel-ratio feedback control program (not shown) stored in a built-in ROM (storage medium). In the main feedback control, the air-fuel ratio (fuel injection quantity) is feedback-corrected so that the air-fuel ratio of the exhaust gas upstream of the catalyst 22 is coincided with the target air fuel ratio based on the output of the upstream sensor 23. In the sub feedback control, the fuel injection quantity are corrected, the target air fuel ratio upstream of the catalyst 22 is corrected, or the feed back correction amount of main feedback control is corrected, so that the air-fuel ratio downstream of the catalyst 22 is coincided with a target control value (for example, the stoichiometric air fuel ratio) based on the output of the downstream sensor 24.

Figure 2:
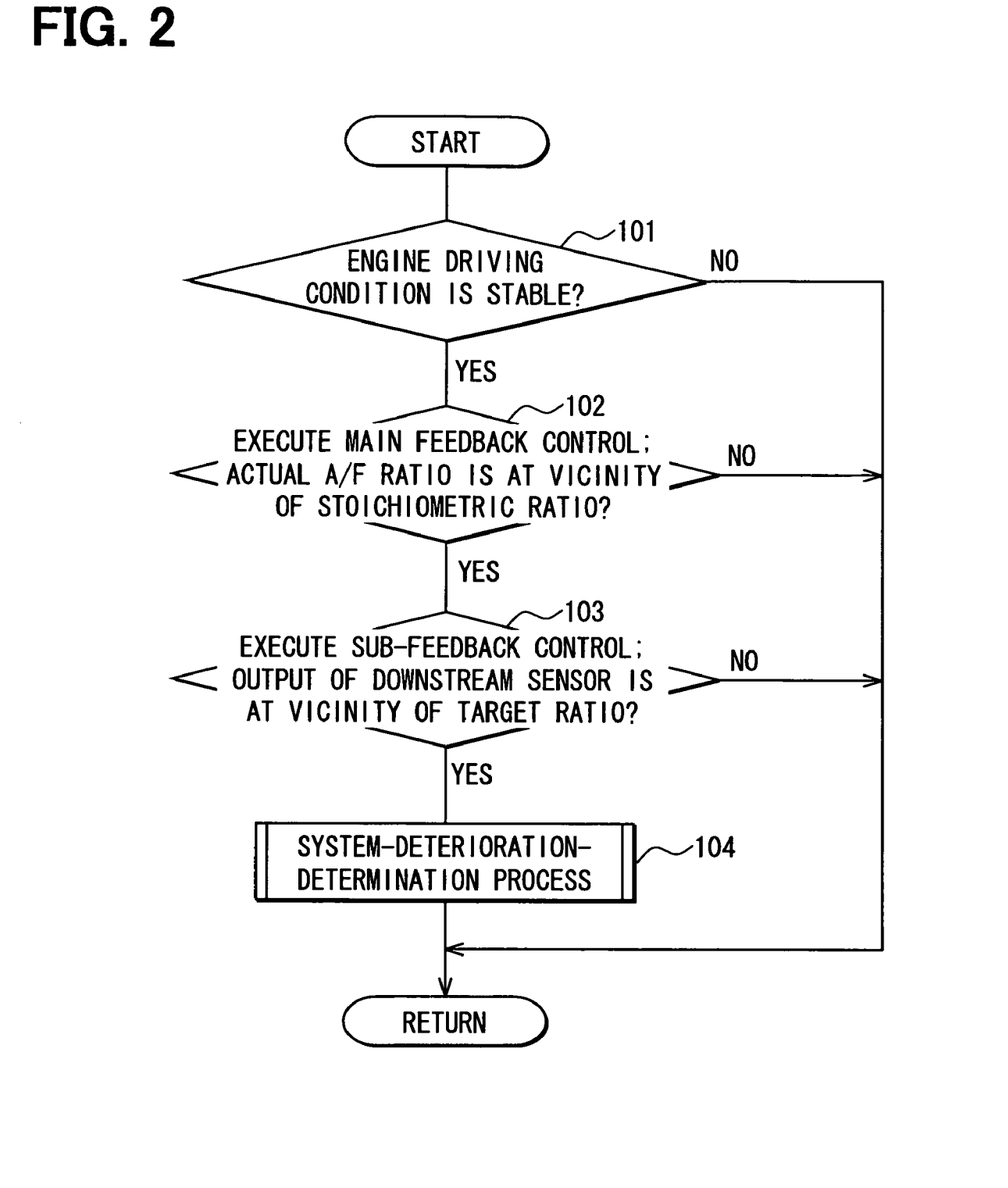
FIG. 2 is a flowchart showing a process of a deterioration-determination execution-condition determination routine according to the first embodiment.
Figure 3:
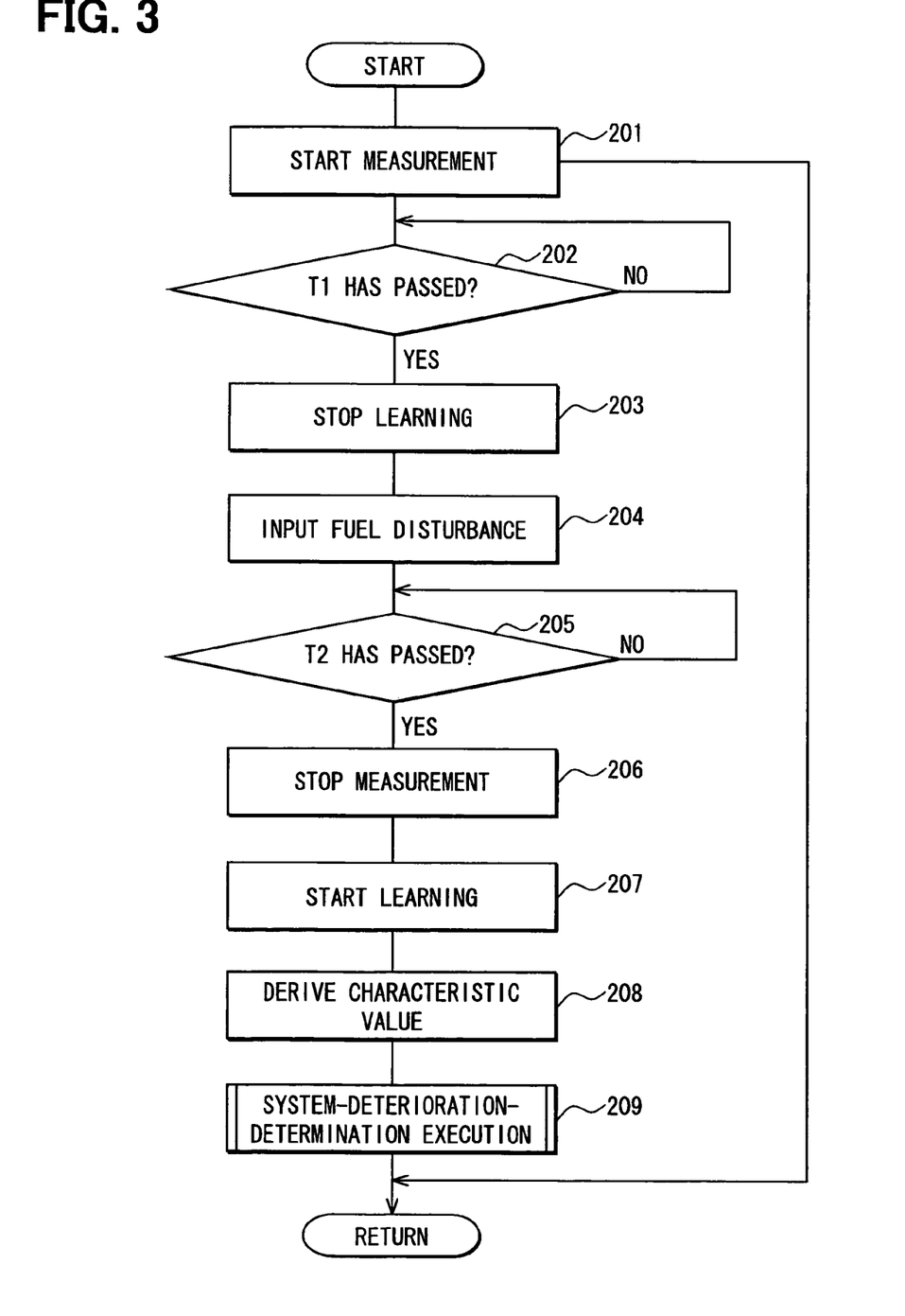
FIG. 3 is a flowchart showing a process of a system-deterioration-determination routine according to the first embodiment.
Figure 4:
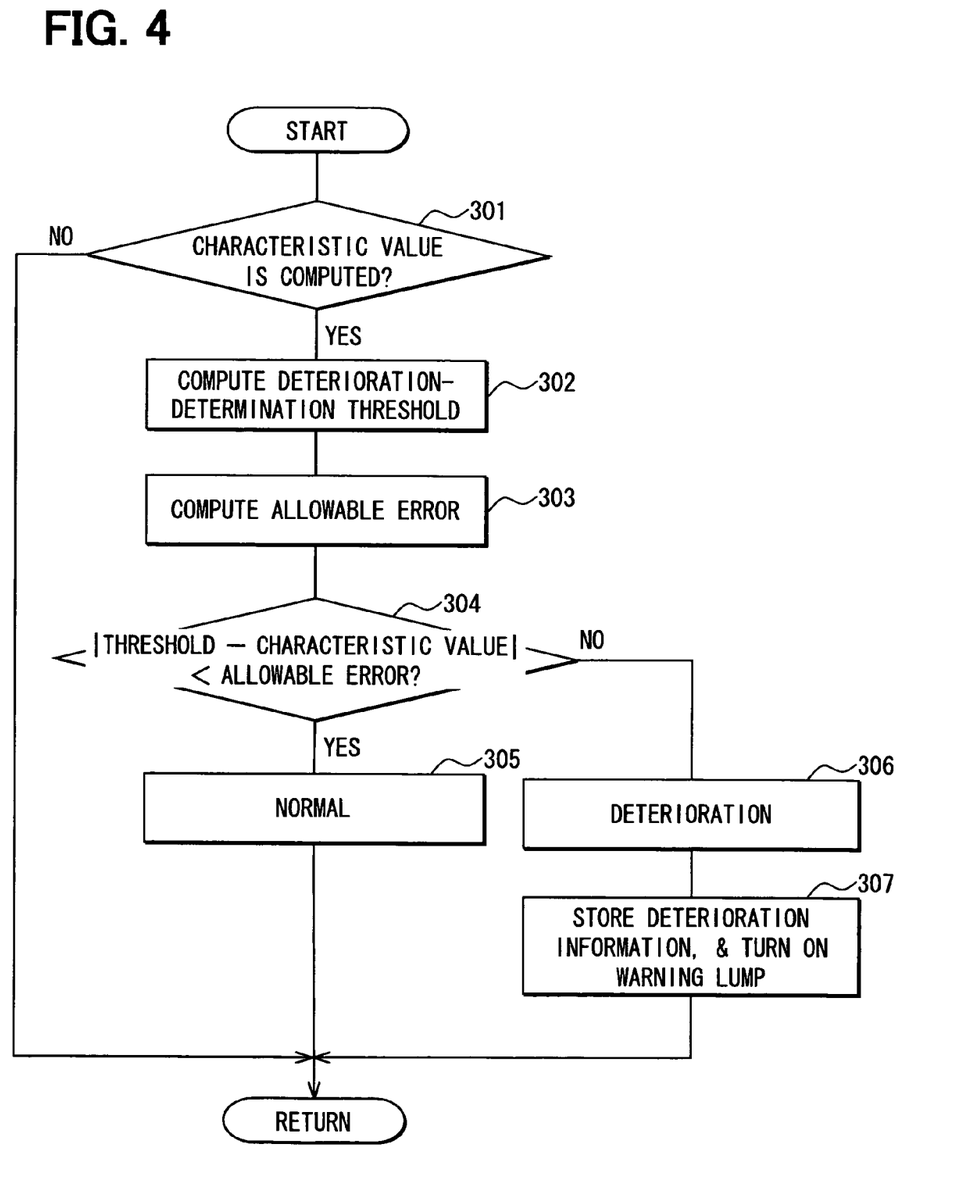
FIG. 4 is a flowchart showing a process of a system-deterioration-determination executing routine according to the first embodiment.

Further, the ECU 27 performs a system-deterioration determination by executing programs shown in FIGS. 2 to 4. While a deterioration-determining condition is established in the main feedback control and the sub-feedback control, a specified fuel disturbance is inputted and an output of the downstream sensor 24 is measured in order to determine whether a purifying capacity of an exhaust gas purifying system including the catalyst 22, the upstream sensor 23, and the downstream sensor 24 is deteriorated based on a behavior of the output of the downstream sensor 24. Referring to FIGS. 2 to 4, the process of the system-deterioration determination will be described.

A condition determination routine shown in FIG. 2 is performed in a specified period during an engine driving. In this routine, it is determined whether a deterioration-determination executing condition is established. In step 101, a computer determines whether an engine driving condition is stable. When the engine driving condition is unstable, the outputs of the upstream sensor 23 and the downstream sensor 24 do not become stable and a disturbance other than the specified fuel disturbance is easily affected, so that an accuracy of the deterioration-determination cannot be assured. Hence, it is one of the deterioration-determination executing conditions that the engine driving condition is stable.

When the answer is No in step 101, the computer determines that the deterioration-determination executing condition is not established to end the routine. When the answer is Yes in step 101, the procedure proceeds to step 102 in which the computer determines whether the main feedback control is executed and the output of the upstream sensor 23 (an actual air-fuel ratio of the exhaust gas flowing into the catalyst 22) is at a vicinity of the stoichiometric ratio that is the target air-fuel ratio. When the main feedback control is executed stably, the air-fuel ratio of the exhaust gas flowing into the catalyst 22 becomes stable at the vicinity of the stoichiometric ratio, so that a deteriorated condition is easily distinguished from a normal condition. The deterioration-determination can be executed in an air-fuel ratio control region at which the engine is mostly operated.

When the answer is No in step 102, the computer determines that the deterioration-determination executing condition is not established to end the routine. When the answer is Yes in step 102, the procedure proceeds to step 103 in which the computer determines whether the sub-feedback control is executed and the output of the downstream sensor 24 is at a vicinity of the stoichiometric ratio that is the target air-fuel ratio. Since the deterioration-determination is executed during the main feedback control and the sub-feedback control, the deterioration-determination can be executed with respect to the whole exhaust purifying system in an air-fuel ratio control region at which the engine is mostly operated.

When the answer is No in step 103, the computer determines that the deterioration-determination executing condition is not established to end the routine. When the answer is Yes in step 103, the procedure proceeds to step 104 in which a system-deterioration-determination routine shown in FIG. 3 is executed.

In step 201, it is started to measure the output of the downstream sensor 24, and in step 202 it is determined whether a specified time period T1 has passed since the start of measurement of the output of the downstream sensor 24. The specified time period T1 is set so that the interior of the catalyst 22 becomes stable.

When the answer is Yes in step 202, the procedure proceeds to step 203 in which a learning process in the sub-feedback control is stopped. In this moment, both learning processes in the sub-feedback control and the main feedback control can be stopped. During the deterioration-determination period, since the output waveform of the downstream sensor 24 fluctuates due to the fuel disturbance, there is a possibility that the learning is erroneously conducted in the sub-feedback control. Similarly, during the deterioration-determination period, since the actual air-fuel ratio of the exhaust gas flowing into the catalyst 22 fluctuates due to the fuel disturbance, there is a possibility that the learning is erroneously conducted in the main feedback control. The learning process can be stopped until the deterioration-determination period is terminated even after the fuel disturbance is finished. Alternatively, the learning process can be stopped only while the fuel disturbance is inputted.

Then, in step 204, the fuel disturbance is inputted. The fuel disturbance is inputted by adding (reducing) a fuel disturbance quantity to (from) the target air fuel ratio in the main feedback control, or multiplying (dividing) the target air fuel ratio by the fuel disturbance quantity. Alternatively, the fuel disturbance is inputted by adding (reducing) a fuel disturbance quantity to (from) the final fuel injection quantity in the main feedback control, or multiplying (dividing) the final injection quantity by the fuel disturbance quantity The fuel disturbance is set according to a following way.

A fuel disturbance quantity is set in such a manner that concentration of rich/lean component of the exhaust gas flowing into the catalyst 22 during the deterioration-determination becomes a specified concentration. The exhaust gas flowing into the catalyst 22 is referred to as incoming gas. The lean component of the incoming gas is O2, NOx and the like, and the rich component of the incoming gas is HC, CO, and the like. When the concentration of the rich/lean component of the incoming gas is varied, the behavior of the output of the downstream sensor 24 is also varied. Hence, it becomes difficult to execute the deterioration-determination. During the deterioration-determination, it is necessary to keep the concentration of the rich/lean component constant. When the fuel disturbance quantity is set in such a manner that the concentration of the rich/lean component of the incoming gas is a minimum concentration for the deterioration-determination, a deterioration of an emission can be restricted.

Figure 5:
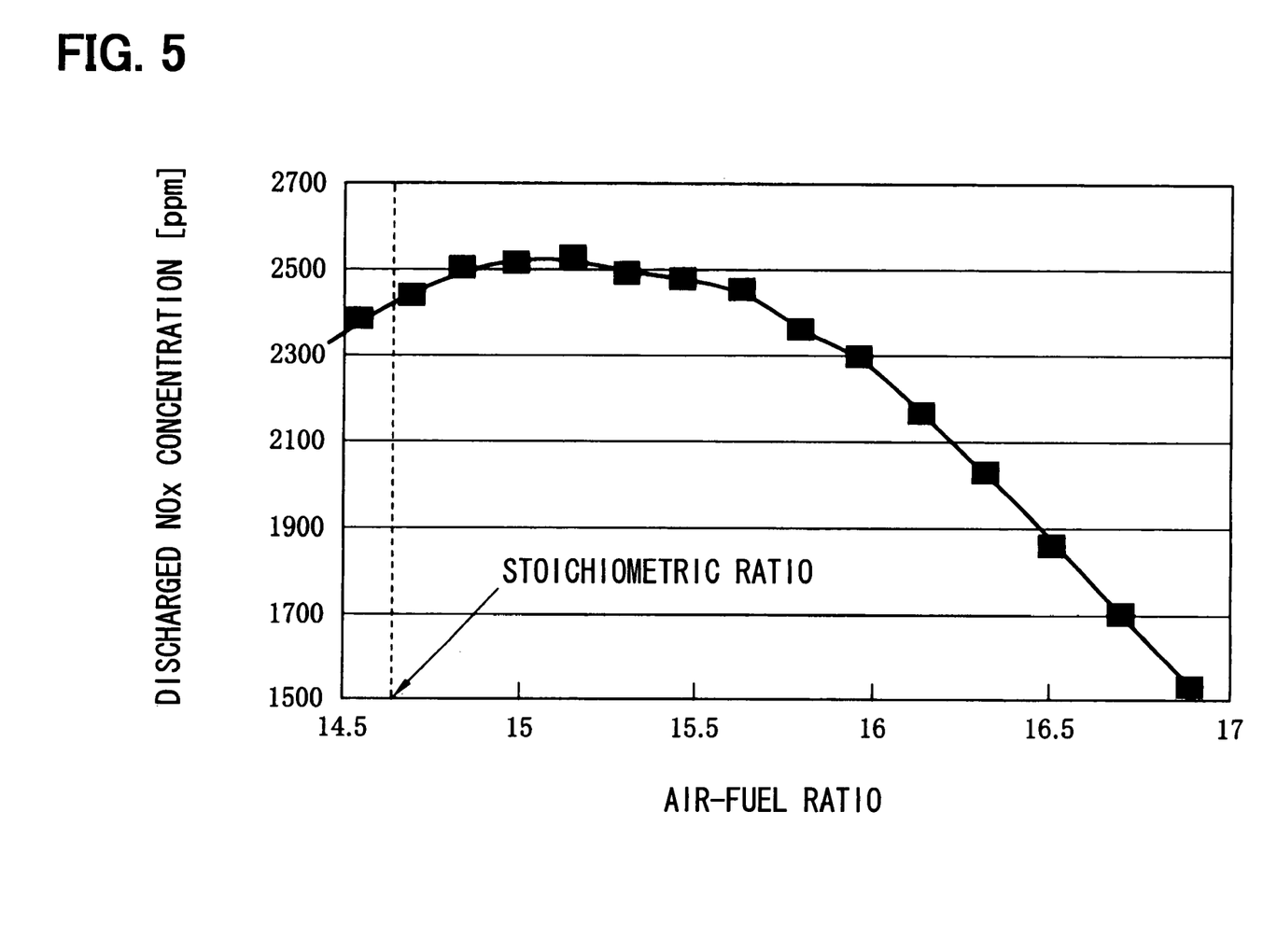
FIG. 5 is a graph showing a steady NOx discharge characteristic.

In a case that the catalyst 22 having a steady NOx discharge characteristic, which is shown in FIG. 5, is used, the target air-fuel ratio is set at an air-fuel ratio (for example, 15.2) in which the concentration of NOx is a specified concentration (for example, 2500 ppm)

Figure 6:
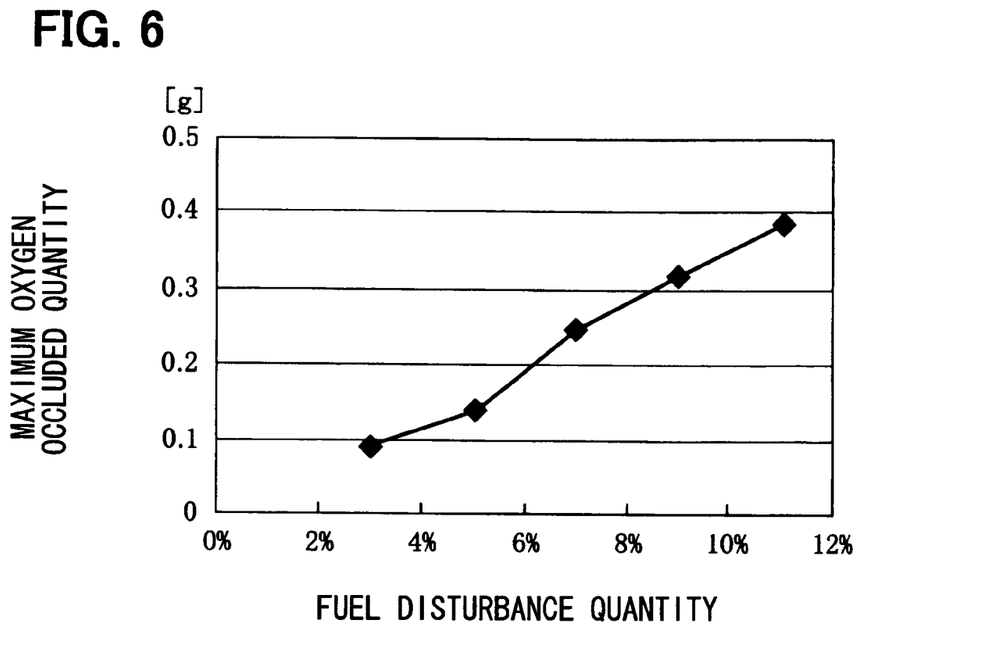
FIG. 6 is a graph showing a relationship between a maximum oxygen occluded quantity and a fuel disturbance quantity.
Figure 7:
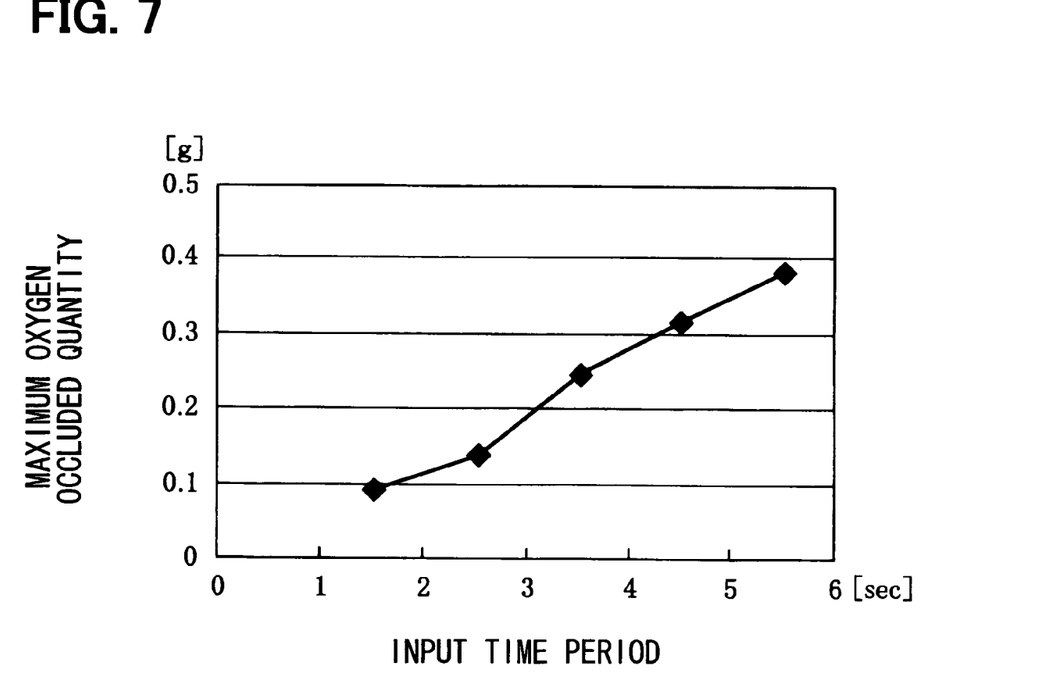
FIG. 7 is a graph showing a relationship between the maximum oxygen occluded quantity and an input period of the fuel disturbance.

As shown in FIGS. 6 and 7, the fuel disturbance quantity and an input period are determined according to a maximum oxygen occluded quantity. The maximum oxygen occluded quantity of the catalyst is a threshold of deterioration-determination to determine whether the catalyst is deteriorated. The maximum oxygen occluded quantity is measured beforehand, and the fuel disturbance quantity and its input period are determined based on the maximum oxygen occluded quantity. The fuel disturbance quantity can be defined by the maximum oxygen occluded quantity, the maximum oxygen occluded quantity×α, or the maximum oxygen occluded quantity+α. The fuel disturbance is determined, considering a correction quantity in the main feedback control and the sub-feedback control.

Figure 8:
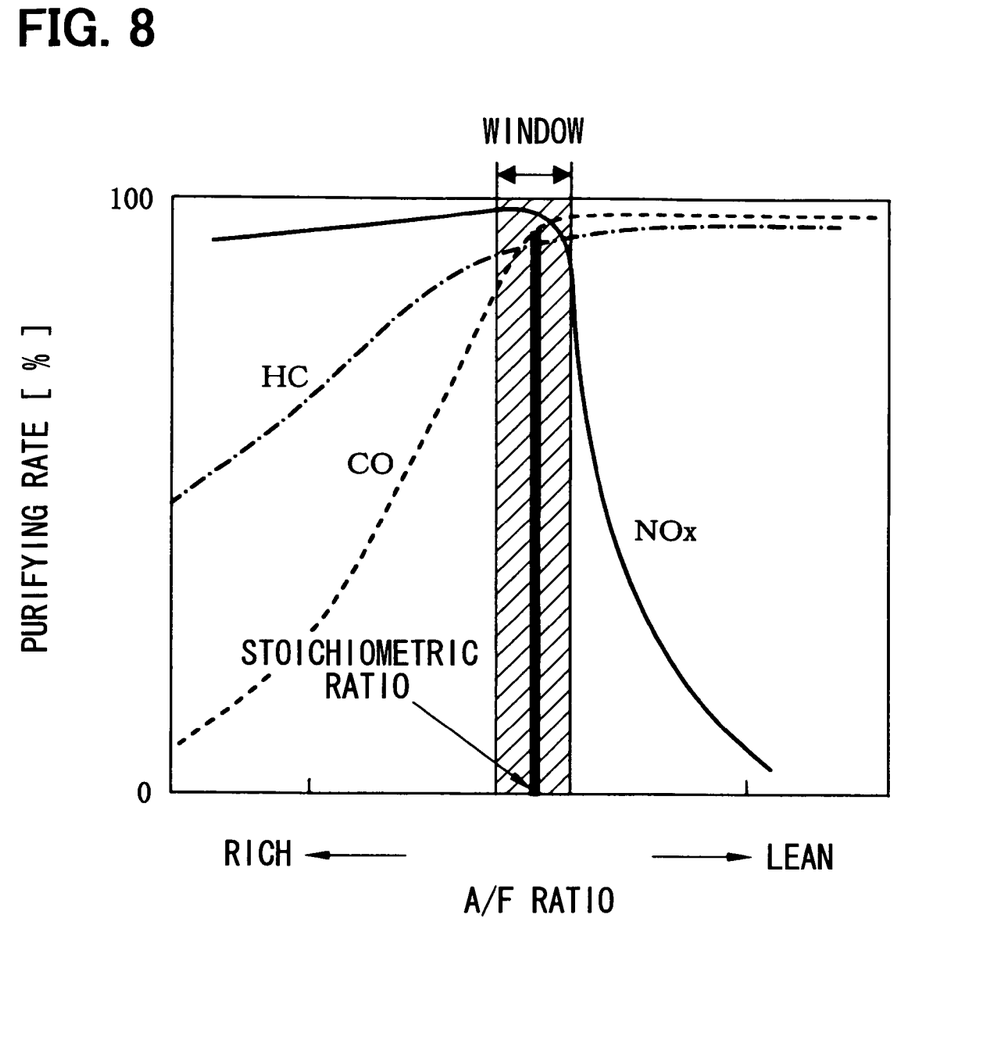
FIG. 8 is a chart showing a catalyst purifying characteristic.
Figure 9:
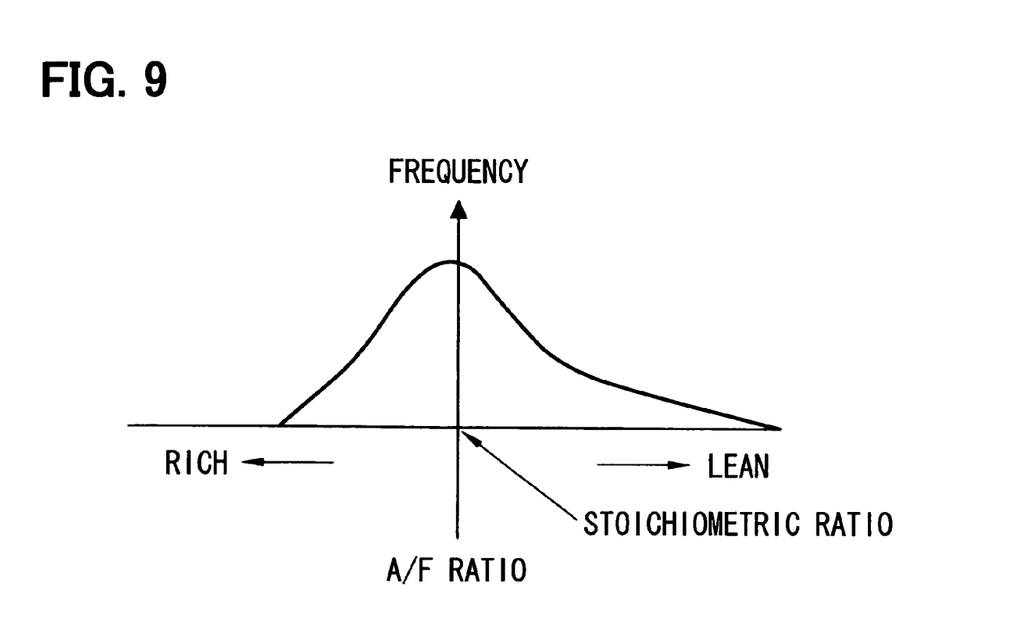
FIG. 9 is a chart showing a frequency of air-fuel ratio.

Furthermore, the fuel disturbance is inputted in a direction where an allowable margin of error is small with respect to an exhaust gas regulation, considering a characteristic of the catalyst 22. The characteristic of the catalyst 22 is determined based on a purifying characteristic shown in FIG. 8, a frequency of air-fuel ratio shown in FIG. 9, and a sensitivity with respect to a mode emission. The input direction of the fuel disturbance is determined based on the characteristic of the catalyst 22. For example, in case the catalyst tends to discharge NOx, that is, NOx purifying rate is notably deteriorated when the catalyst is deteriorated, the fuel disturbance is inputted in a lean direction where discharge quantity of NOx increases. In case the catalyst tends to discharge HC, that is, HC purifying rate is notably deteriorated when the catalyst is deteriorated, the fuel disturbance is inputted in a rich direction where discharge quantity of HC increases. In case a purifying window of the catalyst 22 is narrow, the fuel disturbance can be inputted in the rich direction and the lean direction. Since the fuel disturbance is inputted in the direction where the allowable margin of error is small with respect to the exhaust gas regulation, the deterioration of the catalyst is well detected and the allowable margin of error with respect to the deterioration-determination threshold can be set small.

When the fuel disturbance is inputted, the target air-fuel ratio and the fuel disturbance input period are set so that discharge quantity of a specified gas component (for example, NOx) becomes maximum. For example, in a case that the NOx purifying ratio is notably deteriorated when the catalyst is deteriorated, the target air-fuel ratio is determined in such a manner that the discharge quantity of NOx becomes substantially maximum based on the steady NOx discharge characteristic shown in FIG. 5. The fuel disturbance is inputted at a time at which the maximum oxygen occluded quantity is realized at the target air fuel ratio.

Figure 10:
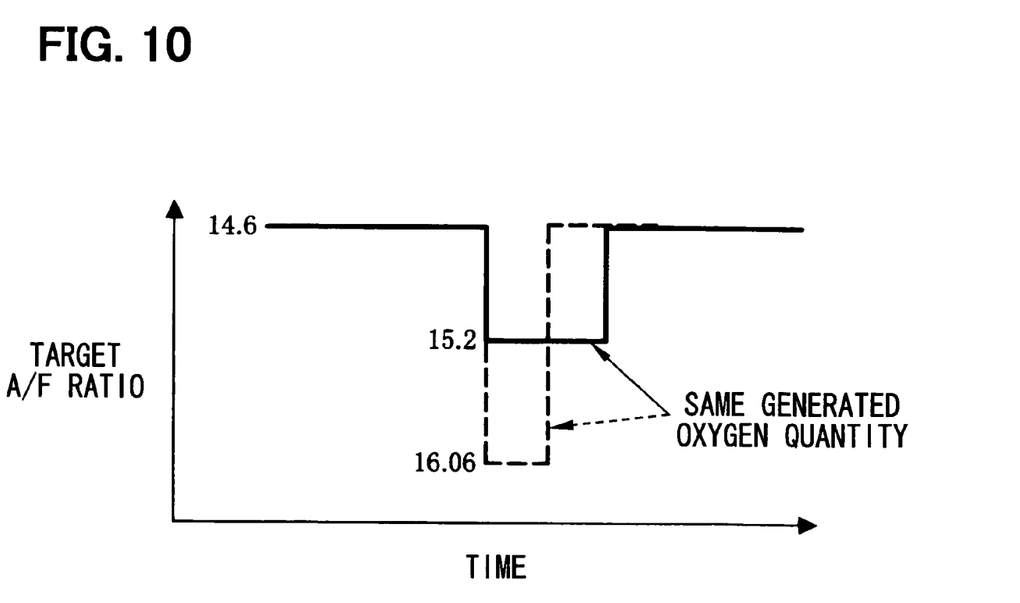
FIG. 10 is a chart for explaining a method of setting a target air-fuel ratio and an input time period of the fuel disturbance in such a manner that discharge amount of a specified gas component (for example, NOx) becomes maximum.

For example, as shown in FIG. 10, in a case that the target air-fuel ratio is set at 16.06, and in a case that the target air-fuel ratio is set at 15.2, a generated oxygen quantity can be the same in both cases by adjusting the input time period of the fuel disturbance. As shown in FIG. 5, when the target air-fuel ratio is set at 16.06, the discharge quantity of NOx decreases. When the target air-fuel ratio is set at 15.2, the discharge quantity of NOx becomes substantially maximum. The target air-fuel ratio and the fuel disturbance input period are set so that a discharge quantity of a specified gas component (for example, NOx) becomes substantially maximum. Hence, the deterioration-determination can be executed under a condition where a generation level of the emission is strict, considering the maximum oxygen occluded quantity. The deterioration-determination can be executed considering the worst condition of the emission.

After the fuel disturbance is inputted, the procedure proceeds to step 205 in which it is determined whether a specified time period T2 has passed. When the time period T2 has passed, the procedure proceeds to step 206 in which the measurement of output of the downstream sensor 24 is stopped. Then, the procedure proceeds to step 207 in which the learning process, which is stopped in step 203, is restarted.

Figure 11:
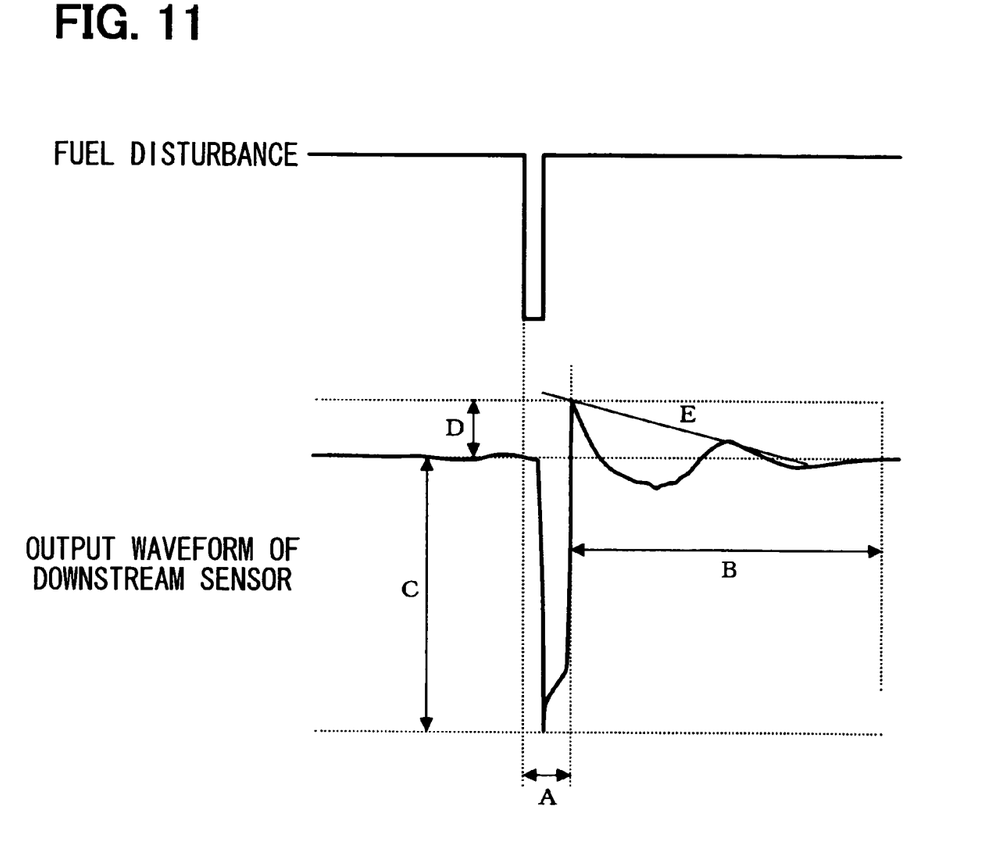
FIG. 11 is a chart for explaining a method of deriving a characteristic value of an output waveform of a downstream sensor.

Then, the procedure proceeds to step 208 in which a characteristic value of the output waveform of the downstream sensor 24 is derived. The characteristic value of the output waveform of the downstream sensor 24 is represented by, as shown in FIG. 11, a response period A, a convergence period B, an undershoot amount C, an overshoot amount D, an area (an integrated value of deviation between the sensor output and a target voltage), a trajectory length, an existing rate in a specified range (target voltage number of data in the range/population parameter), a dispersion (standard deviation), an attenuation coefficient E, and the like. The characteristic value may include a single value or multiple values. The characteristic value of the output waveform of the downstream sensor 24 enhances an accuracy of deterioration-determination without receiving an effect of noise or other disturbance superimposing on the output of the downstream sensor 24.

After deriving the characteristic value, the procedure proceeds to step 209 in which a system-deterioration-determination executing routine shown in FIG. 4 is performed.

In step 301, the computer determines whether the characteristic value is computed. When the answer is No in step 301, the procedure ends.

When the answer is Yes in step 301, the procedure proceeds to step 302 in which a deterioration-determination threshold is computed according to the current engine driving condition by use of a map. Since the exhaust gas quantity varies according to the engine driving condition, the deterioration-determination threshold is also varied according to the engine condition. In order to simplify the computation, the deterioration-determination threshold can be a constant value without respect to the engine driving condition.

Then, the procedure proceeds to step 303 in which an allowable error with respect to the deterioration-determination threshold is computed according to the current engine driving condition by use of a map. Since the dispersion of data and noise causing the allowable error is varied according to the engine driving condition, the allowable error is also varied according to the engine driving condition. In order to simplify the computation, the allowable error can be a constant value without respect to the engine driving condition.

Then, the procedure proceeds to step 304 in which the computer determines whether an absolute value of the deviation between the deterioration-determination threshold and the characteristic value is smaller than the allowable error. When the answer is Yes in step 304, the procedure proceeds to step 305 in which the computer determines that the exhaust gas purifying system is normal.

When the answer is No in step 304, the procedure proceeds to step 306 in which the computer determines that the exhaust gas purifying system is deteriorated. In step 307, the deterioration information is stored in a backup RAM and a warning lamp or a warning indicator provided on an instrumental panel is turned on to inform the driver of the deterioration information.

Figure 12:
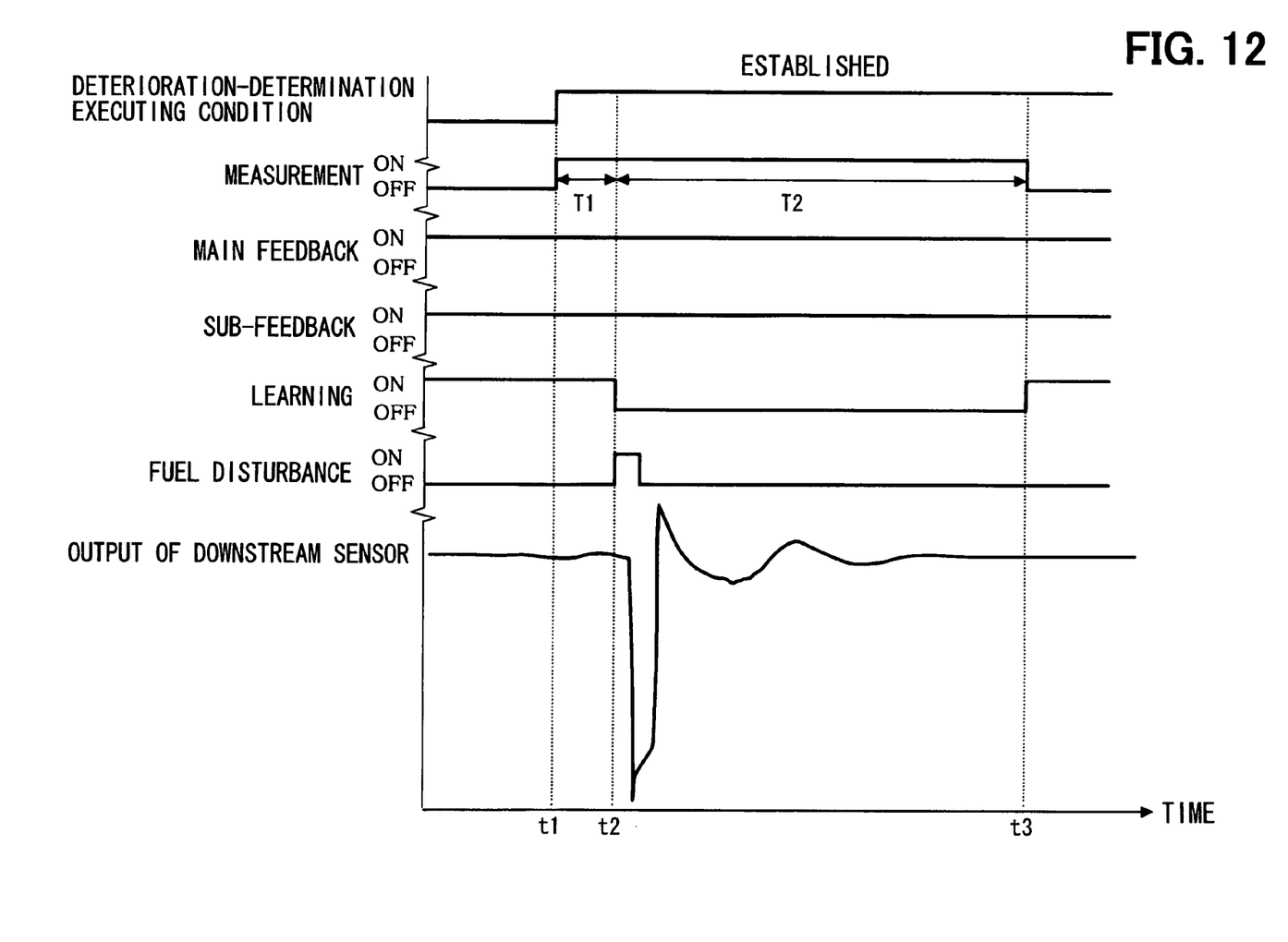
FIG. 12 is a time chart showing a deterioration-determination process according to the first embodiment.

FIG. 12 is a time chart for explaining the system-deterioration-determination process according to the first embodiment. At time of t1 in which the engine driving condition is stable and the deterioration-determination executing condition is established, the measurement of output of the downstream sensor 24 is started. At time of t2 at which the specified time period T1 required for making the catalyst 22 stable has passed, the learning process in the sub-feedback control is stopped (or both in sub-feedback control and main control) and the fuel disturbance is inputted.

At time of t3 at which a specified period T2 has passed, the measurement of output of the downstream sensor 24 is ended. In the system-deterioration-determination period (t1-t3), the main feedback control and the sub-feedback control are continued. At the time of t3, the characteristic value of the output waveform of the downstream sensor 24 is derived. And the computer compares the absolute value of the deviation between the deterioration-determination threshold and the characteristic value with the allowable error in order to determine whether the exhaust gas purifying system is deteriorated. The learning process which is stopped in the system-deterioration-determination period (t1-t3) is restarted.

According to the first embodiment, the fuel disturbance is inputted in order to measure the output of the downstream sensor 24 during the execution of the main feedback control and the sub-feedback control and it is determined whether the purifying capacity of the exhaust purifying system is deteriorated based on the characteristic value of the output waveform without deteriorating emissions.

Second Embodiment

Figure 13:
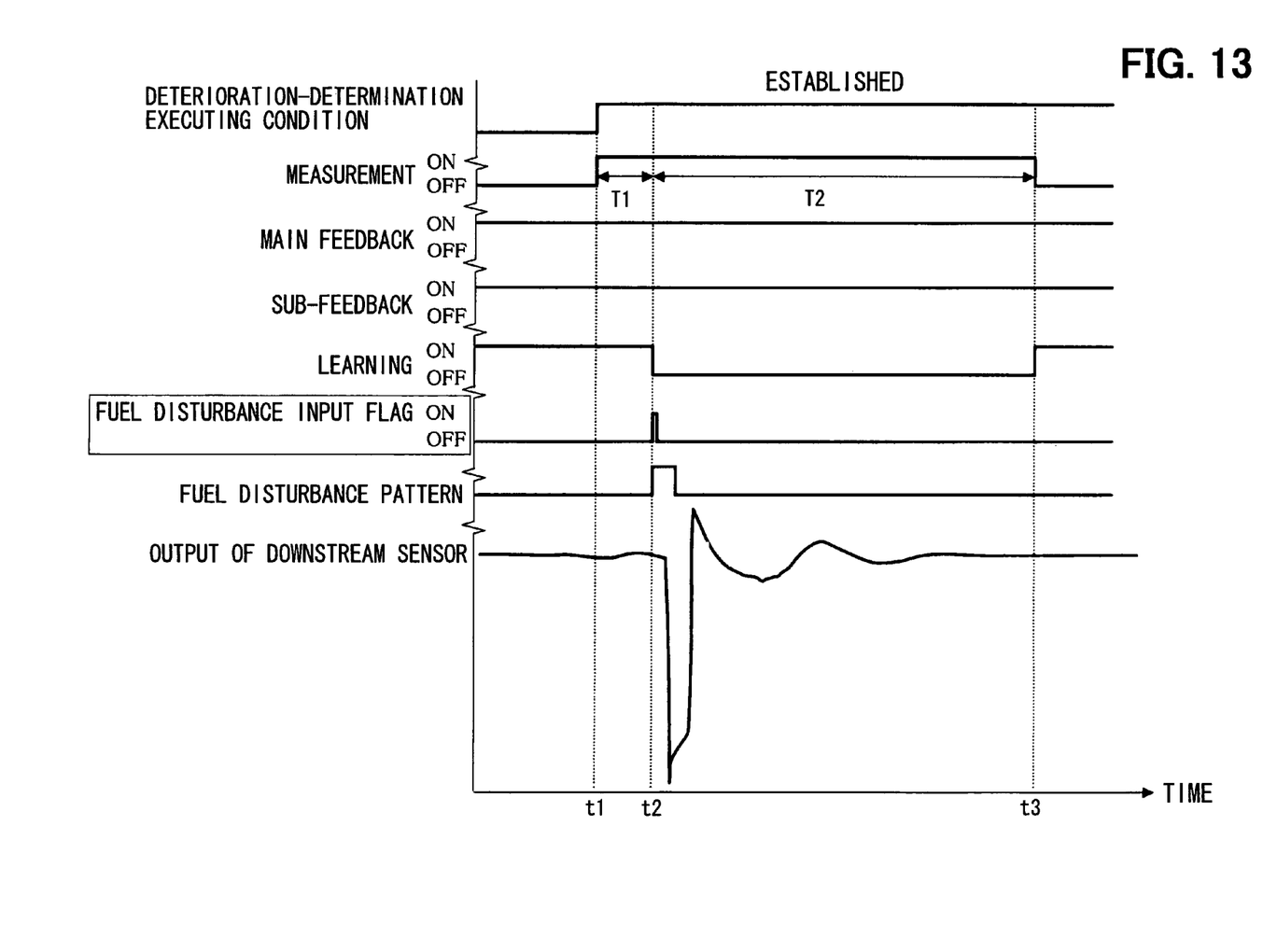
FIG. 13 is a time chart showing a deterioration-determination process according to a second embodiment.

FIG. 13 shows a second embodiment of the present invention. The ECU 27 includes a fuel disturbance input flag for inputting the fuel disturbance in a specified pattern during the deterioration-determination. At the time of t2 at which a specified time period T1 has passed from the time of t1, a fuel disturbance input condition is established to turn On the fuel disturbance input flag so that the fuel disturbance is inputted in the specified input pattern. The other configuration is the same as the first embodiment.

According to the second embodiment, by turning On the fuel disturbance input flag, an equal quantity of the fuel disturbance is easily inputted at a desired timing.

Third Embodiment

Figure 14:
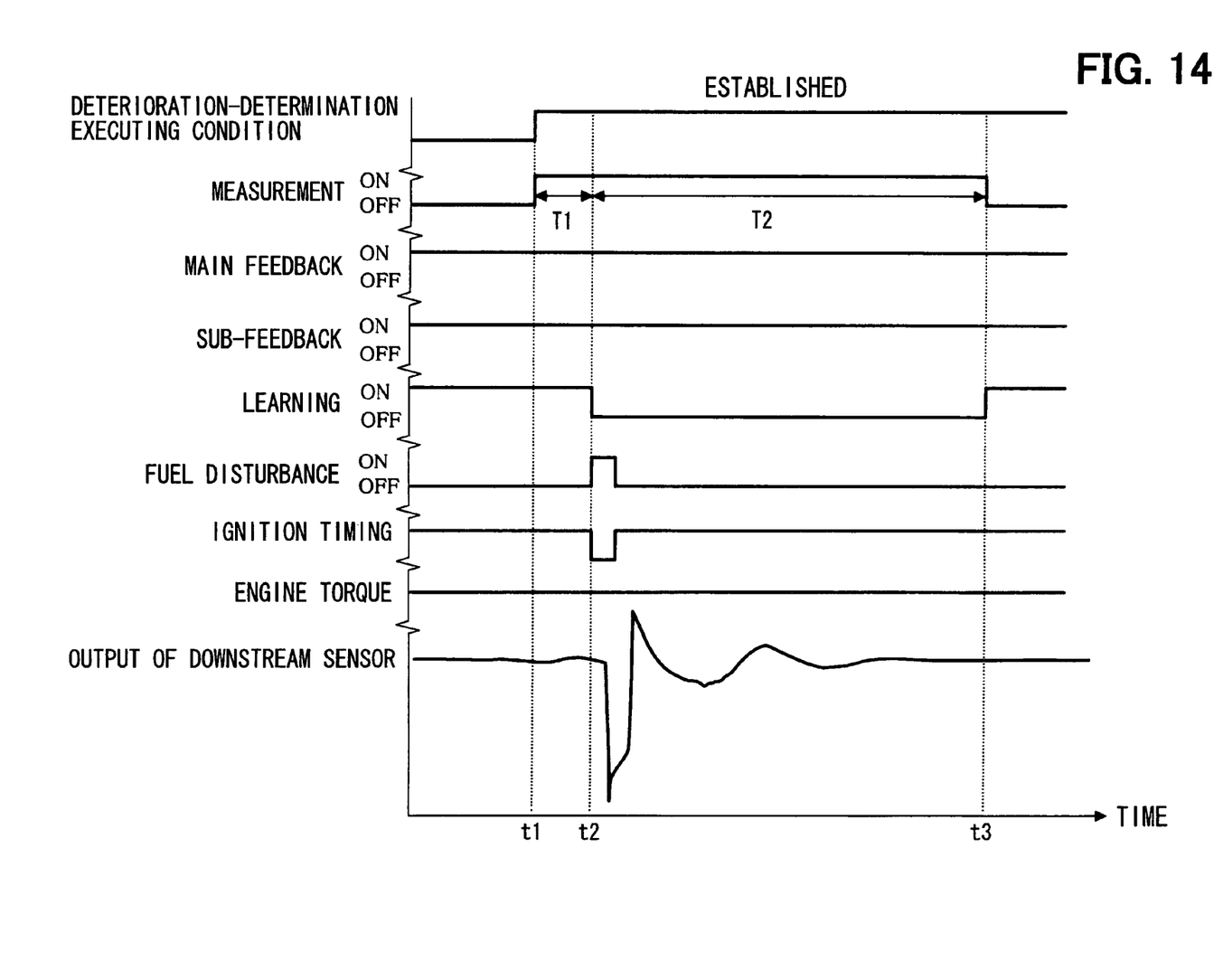
FIG. 14 is a time chart showing a deterioration-determination process according to a third embodiment.

FIG. 14 shows a third embodiment. A fluctuation of engine torque (a torque down or a torque up), which is generated due to the input of the fuel disturbance during the deterioration-determination, is compensated by changing an engine control parameter that has no effect on an engine emission. The engine control parameter includes a throttle opening degree, an ignition timing, a number of injection, a variable valve timing, and the like. As shown in FIG. 14, the ignition timing is corrected according to the input pattern of the fuel disturbance so that the fluctuation of the engine torque is restricted. The other configuration is the same as the first and second embodiments.

According to the third embodiment, the fluctuation of engine torque is compensated by changing the parameter, so that the deterioration-determination of the exhaust gas purifying system is executed without deteriorating drivability.

In the system shown in FIG. 1, the upstream sensor 23 is the air-fuel ratio sensor and the downstream sensor 24 is the oxygen sensor. Alternatively, the downstream sensor 24 can be an air-fuel ratio sensor. Both of the upstream sensor 23 and the downstream sensor can be oxygen sensors.

What is claimed is:

1. A deterioration-determination apparatus for an exhaust gas purifying system that includes a catalyst in an exhaust passage of an engine for purifying exhaust gas, an upstream sensor and a downstream sensor that detect an air-fuel ratio or a rich/lean condition of the exhaust gas, the upstream sensor being disposed upstream of the catalyst, the downstream sensor being disposed downstream of the catalyst, the deterioration-determination apparatus comprising:

a feedback control means for performing a feedback control in which a fuel injection quantity is feedback-corrected based on an output of the upstream sensor so that an air-fuel ratio upstream of the catalyst tends towards a target air-fuel ratio;

a sub-feedback control means for adjusting (a) the fuel injection quantity or (b) the main feedback control based on an output of the downstream sensor; and a deterioration-determination means for determining whether a purifying capacity of the exhaust gas purifying system including the catalyst, the upstream sensor and the downstream sensor is deteriorated based on a behavior of an output of the downstream sensor into which a fuel disturbance is inputted during operation of the main feedback control and the sub-feedback control, wherein the deterioration-determination means sets a target air-fuel ratio and an input time period of the fuel disturbance so that a discharge quantity of a specified gas component becomes substantially maximum in inputting the fuel disturbance.

2. A deterioration-determination apparatus according to claim 1, wherein the deterioration-determination means sets a quantity of the fuel disturbance so that a concentration of rich/lean component of the exhaust gas flowing into the catalyst during a deterioration-determination becomes a specified concentration.

3. A deterioration-determination apparatus according to claim 1, wherein
the deterioration-determination means sets a quantity of the fuel disturbance according to a maximum oxygen occluded quantity of the catalyst.

4. A deterioration-determination apparatus according to claim 1, wherein
the deterioration-determination means inputs the fuel disturbance in a direction where an allowable margin of error is small with respect to an exhaust gas regulation.

5. A deterioration-determination apparatus according to claim 1, wherein
the deterioration-determination means determines whether the exhaust gas purifying system is deteriorated based on a characteristic value of an output waveform of the downstream sensor.

6. A deterioration-determination apparatus according to claim 5, wherein
the deterioration-determination means determines whether the exhaust gas purifying system is deteriorated by comparing the characteristic value with a predetermined deterioration-determination threshold.

7. A deterioration-determination apparatus according to claim 1, further comprising a warning means for serving a notice that the exhaust gas purifying system is deteriorated when the deterioration-determination means detects a deterioration thereof.

8. A deterioration-determination apparatus according to claim 1, wherein
the deterioration-determination means includes a fuel disturbance input flag which is turned on when a specified fuel disturbance input condition is established during executions of the main feedback control and the sub-feedback control so that the fuel disturbance is inputted in a specified input pattern.

9. A deterioration-determination apparatus according to claim 1, wherein
the deterioration-determination means compensates a fluctuation of engine torque, which is generated due to the input of the fuel disturbance during a period of the deterioration-determination, by changing an engine control parameter that has no effect on an engine emission.

10. A method for determining deterioration of an exhaust gas purifying system that includes a catalyst in an exhaust passage of an engine for purifying exhaust gas, an upstream sensor and a downstream sensor that detect an air-fuel ratio or a rich/lean condition of the exhaust gas, the upstream sensor being disposed upstream of the catalyst, the downstream sensor being disposed downstream of the catalyst, the method comprising:
performing feedback control in which a fuel injection quantity is feedback-corrected based on an output of the upstream sensor so that an air-fuel ratio upstream of the catalyst tends towards a target air-fuel ratio;
performing a sub-feedback control which adjusts (a) fuel injection quantity or (b) the main feedback control based on an output of the downstream sensor; and
determining whether a purifying capacity of the exhaust gas purifying system including the catalyst, the upstream sensor and the downstream sensor is deteriorated based on a behavior of an output of the downstream sensor into which a fuel disturbance is inputted during operation of the main feedback control and the sub-feedback control,
wherein a learning process in at least the sub-feedback control is stopped when the fuel disturbance is inputted into the downstream sensor, and
wherein a target air-fuel ratio and an input time period of the fuel disturbance are set so that a discharge quantity of a specified gas component becomes substantially maximum in inputting the fuel disturbance.

* * * * *